United States Patent Office 3,541,328
Patented Nov. 17, 1970

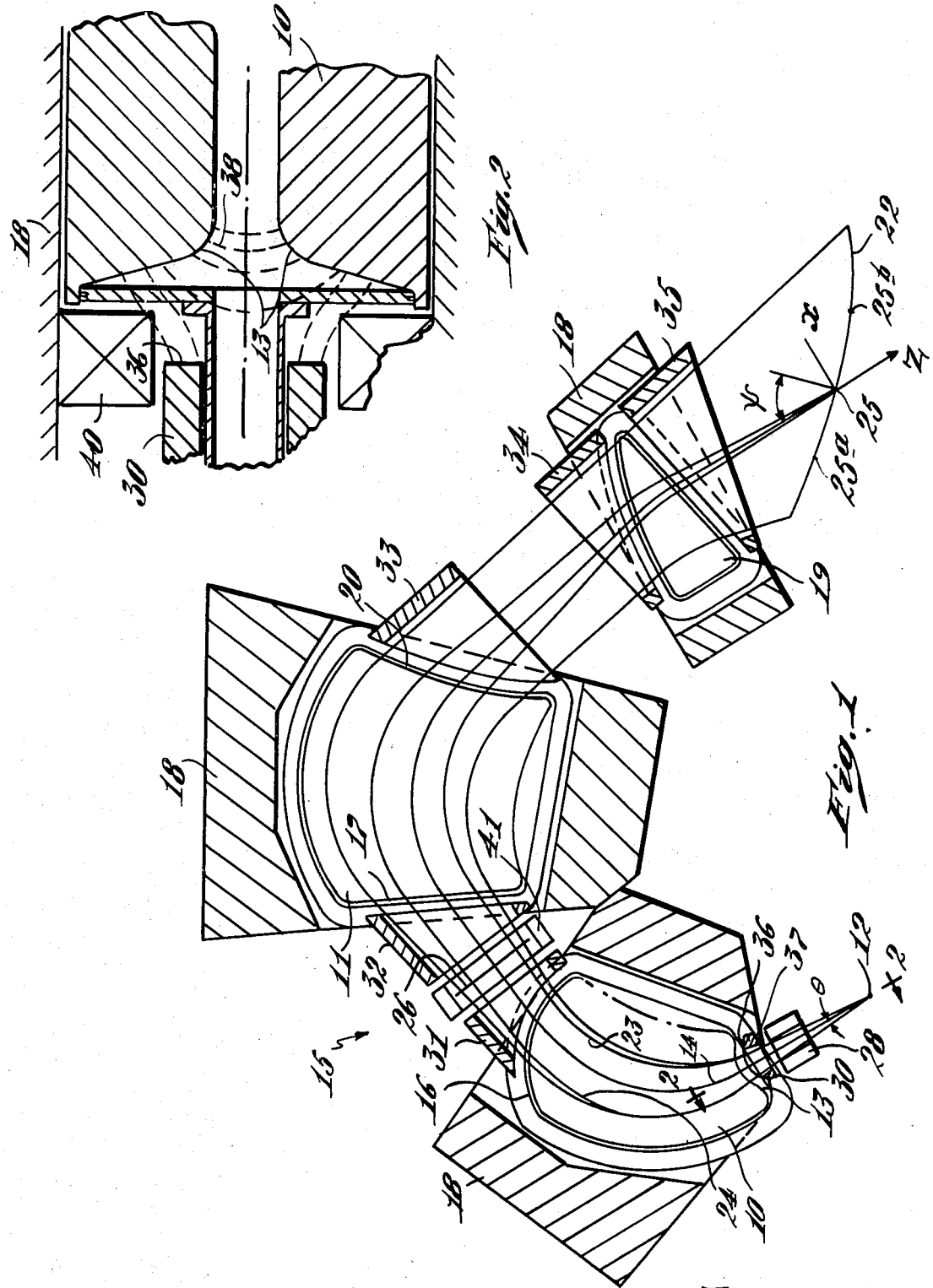

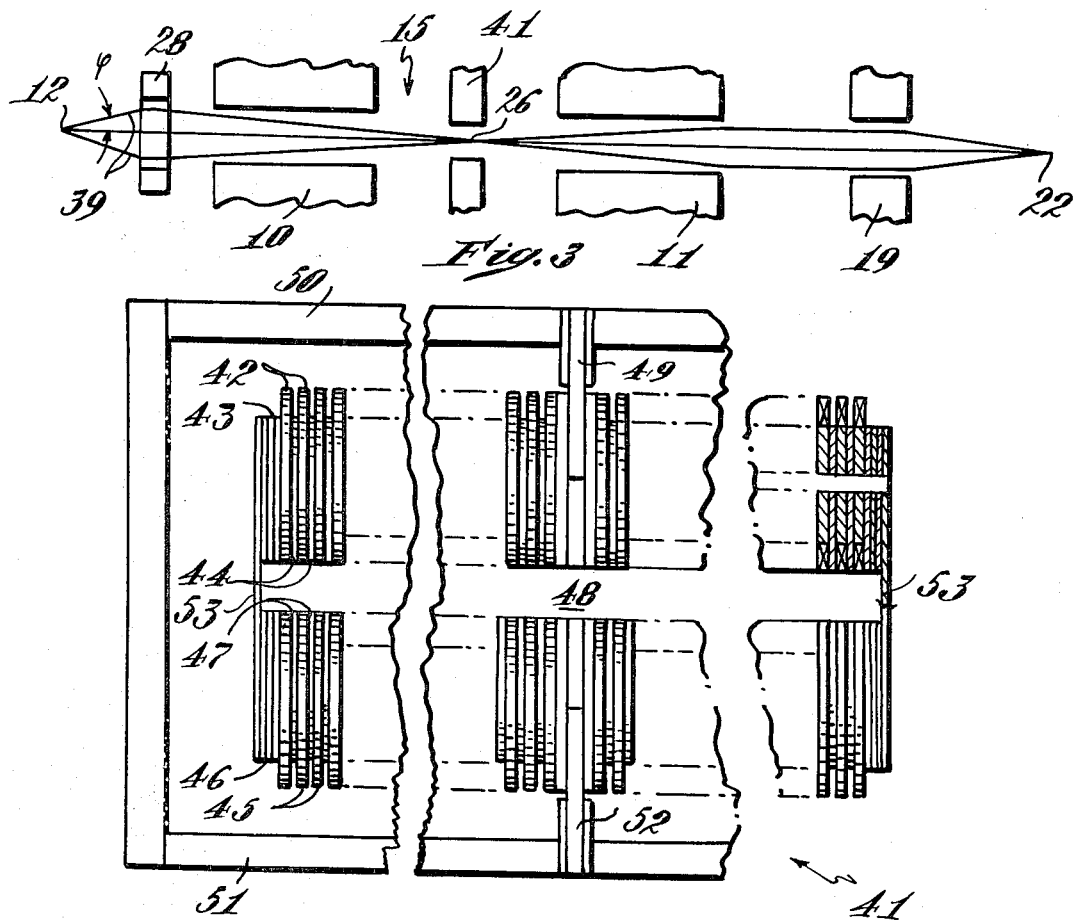
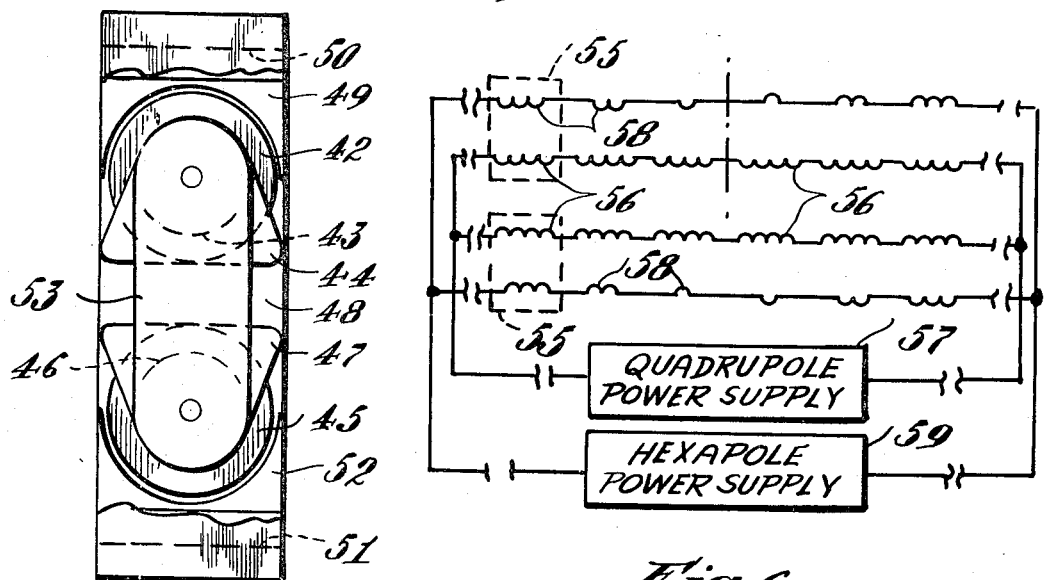

3,541,328
MAGNETIC SPECTROGRAPH HAVING MEANS FOR CORRECTING FOR ABERRATIONS IN TWO MUTUALLY PERPENDICULAR DIRECTIONS
Harald A. Enge, Winchester, Mass., assignor to Deuteron, Inc., Winchester, Mass., a corporation of Massachusetts
Filed Mar. 12, 1969, Ser. No. 806,536
Int. Cl. H01j 39/34
U.S. Cl. 250—41.9
18 Claims

ABSTRACT OF THE DISCLOSURE

A magnetic spectrograph utilizing at least a first magnetic field region and a second magnetic field region and further utilizing means for focusing charged particles which enter such spectrograph along an intermediate focal line lying substantially in the median plane of the spectrograph between such first and second magnetic field regions. The exit and entrance boundaries of such magnetic field regions can then be appropriately shaped so as to independently correct for aberrations in the trajectories of particles moving in the median plane and for aberrations in the trajectories of particles moving off the median plane. A variable magnetic means can be mounted at or near such intermediate focal line so as to further provide for dynamic adjustments of such aberration corrections.

---

This invention relates generally to apparatus for measuring the energy spectrum of a plurality of charged particles and, more particularly, to a magnetic energy spectrum analyzing apparatus for providing stigmatic focusing of such particles along a focal line, the positions of the focused particles which are dispersed along such focal line being dependent on the momentum of each of said particles.

In such devices, the energy spectrum may be measured either by photographic methods, by counting methods, or by other suitable detecting devices, photographic emulsion techniques often being employed in a spectrograph instrument wherein, for example, the entire range of focused particles produced by the magnet is recorded on a photographic plate in one exposure. The photographic image is then examined under a microscope and the number of tracks made by the incident particles is counted by eye.

Various types of magnetic spectrographs have been described in the prior art. For exampe, my article, "Combined Magnetic Spectrograph and Spectrometer," published in the Review of Scientific Instruments, vol. 29, No. 10, October 1958, pages 885–888, describes a magnetic spectrograph instrument which is operated with a magnetic quadrupole lens to form a high intensity spectrometer. The instrument described therein, and also described in my prior U.S. Pat. No. 3,084,249 issued on Apr. 2, 1963, is capable of utilizing a relatively large input solid angle for collecting particles from a source without the need for a very large magnet gap.

Further, magnetic spectrographs of the split-pole type have been described in the article, "Split-Pole Magnetic Spectrograph for Precision Nuclear Spectroscopy," by J. E. Spencer and H. A. Enge published in Nuclear Instruments and Methods, vol. 49, No. 2, pages 181–193 (1967) and in my U.S. Pat. No. 3,213,276 issued on Oct. 19, 1965.

While the instruments described in the above-referenced articles and patents have been found useful in analyzing the energy spectrum, such instruments have been unable to correct in the most effective manner for all of the aberrations, or focusing errors, which occur during operation of the device. Moreover, such previously used instruments are not particularly effective in removing errors due to kinematic broadening, that is, the image displacement of particles in the direction of travel, an effect which causes them to be focused off the desired focal line to a degree dependent upon the angle between the direction of the incident and the emitted particles. Such kinematic broadening effects are discussed in my above-referenced article in the Review of Scientific Instruments.

In general, the apparatus of this invention utilizes two main deflecting magnets and is in this respect similar to the type shown in my U.S. Pat. No. 3,213,276. However, in addition to the structure described in such patent, the apparatus of the invention provides means for transversely focusing the incoming charged particles along an intermediate focal line which lies substantially in the median plane (i.e., the plane of symmetry of the device) between the source and the output focal line so that an intermediate image occurs approximately midway through the instrument within the gap separating the main deflecting magnets. The intermediate image, or crossover point, may be obtained by arranging the instrument to provide for a relatively large entrance angle for incoming particles at the entrance boundary of the first main magnet and to provide for a relatively large exit angle for such outgoing particles at the exit boundary of the second main magnet. Alternatively, such crossover point may be achieved by utilizing a single magnetic quadrupole lens between the source and the first main magnet, the characteristics of such lens being arranged to produce a focusing of the particles at the appropriate intermediate image line in addition to providing for a relatively large input solid angle of particle acceptance. Such intermediate focusing may also be accomplished by combining the use of such a quadrupole lens with the use of appropriately large entrance and exit angles.

Displacements of the rays of incoming charged particles in the transverse direction, that is, the direction parallel to the direction of the magnetic field lines and transverse to the median plane is thereby substantially small at the intermediate image position. The displacement in the transverse direction, however, is relatively large at the entrance boundary of the first main magnet and at the exit boundary of the second main magnet. Such overall displacement characteristics allows the apparatus to be arranged for correcting focusing errors more easily than is possible in previously known instruments. Thus, aberrations resulting from a divergence of particles out of the median plane can be corrected primarily by properly shaping the pole boundaries at the entrance to the first main magnet and at the exit of the second main magnet, where the effects of curved boundaries on corrections of such aberrations are relatively large but where the effects on median plane rays are relatively small. Aberrations resulting from a divergence of particles within the median plane can be corrected by properly shaping the pole boundaries nearest to the intermediate image, or crossover position, that is, at the exit of the first main magnet and at the entrance of the second main magnet where the effects on these rays are relatively large but where the effects on rays moving out of the median plane are very small because these boundaries are near the crossover point. In this manner, corrections of aberrations occurring in the median plane and those occurring transverse to the median plane can be achieved substantially independently of each other. A particular method for making such aberration corrections by solving appropriate simultaneous equations is described in more detail below.

While the correction of such aberrations can be anticipated by an examination of the geometry of the overall instrument and provisions can be made for the appropriately shaped curvatures at the entrance and exit boundaries of the two main magnets during manufacture of the apparatus, it is often further desirable to provide for a dynamic correction of such aberrations, particularly in the median plane, so as to improve the resolution of the device and to provide a further reduction in aberrations which occur in the subsequent operation of the device. For this purpose, the apparatus of the invention is further adapted to utilize a multipolar electromagnetic corrective element which is placed at, or near, the crossover, or intermediate, image position. Such corrective element utilizes a plurality of adjacent magnetic pole pieces and associated coils, the current through the coils being suitably controllable to provide an appropriately shaped magnetic field for this purpose. Because such corrective element is placed at, or approximately near, the intermediate crossover image point, its operation will not effect corrections made for aberrations transverse to the median plane which, as described above, are provided by the appropriate shaping of the entrance and exit boundaries of the first and second main magnets, respectively.

Moreover, corrections for kinematic broadening effects can be easily achieved with such a dynamic correction element. In previously known spectrographs, kinematic broadening effects were corrected primarily by physically moving the detector inwardly and outwardly along the central ray of particles to a position where the focal points of all the charged particles tend to lie substantially in the plane of the detector. If the corrections required are relatively large, however, the structural configuration of the spectrograph may prevent the detector from being moved to the proper position to provide for such correction. Moreover, even if it can be so moved, any relatively large movement may cause focusing in the transverse direction to deteriorate so that the focal line becomes substantially longer. In the apparatus of the invention, however, corrections for kinematic broadening effects can be made more easily by utilizing the electromagnetic corrective element discussed above and described in more detail below.

The details of the structure of a preferred embodiment of the invention and its operation can be understood more clearly with the help of the accompanying drawings wherein:

FIG. 1 shows a horizontal cross-sectional view taken along the median plane of a magnetic spectrograph constructed in accordance with a preferred embodimnet of the invention;

FIG. 2 is a vertical cross-sectional view of a portion of the magnetic spectrograph taken along the line 2—2 of FIG. 1;

FIG. 3 shows a simplified diagrammatic view of particle trajectories out of the median plane;

FIG. 4 shows a cross-sectional view of an electromagnetic multipolar corrective element utilized in the apparatus of FIG. 1;

FIG. 5 shows an end view of the corrective element of FIG. 4; and

FIG. 6 shows a diagrammatic view of one embodiment of a circuit for use in the corrective element of FIG. 5.

In FIG. 1 a magnetic spectrograph of the intermediate image type has a first main magnet, the lower pole face 10 of which is shown in the figure, and a second main magnet, the lower pole face 11 of which is also shown (each main magnet having, of course, a corresponding upper pole face not shown in the figure). A third auxiliary magnet, in the form of a sector magnet the lower pole face 19 of which is shown in the figure, is positioned between the exit boundary 20 of the second main magnet and an output focal line 22, at which line a suitable detecting device (not shown) can be placed.

Associated with each magnet is an appropriate yoke structure 18 and coil structure 40 (not specified in FIG. 1 but shown in FIG. 2, for example, with reference to the first main magnet). Such structures are well known to those in the art and need not be discussed in further detail. Further associated with each of the above magnets at the entrance and exit boundaries thereof are magnetic field clamping devices 30, 31, 32, 33, 34 and 35, respectively. Such devices are substantially formed in tubular metallic configurations each having an aperture through which the charged particles pass. For example, magnetic clamp 30, at the entrance boundary 13 of the first main magnet, has a tubular shape, the configuration of its surface 36 nearest to entrance boundary 13 conforming to the surface configuration of such boundary. Similarly each of the other clamps conform in configuration to the entrance or exit boundary with which it is associated. The configuration of the surface 37 of clamp 30 which is furthest from its associated boundary is substantially flat and arranged to be essentially perpendicular to the direction of travel of the charged particles at that point. The corresponding surfaces of the other clamping devices are similarily arranged.

The clamping devices thereby provide a means for controlling the configuration of the fringing field of the magnets at their entrance and exit boundaries. Thus, since such changes, in effect, act to short circuit the magnetic field, their placement and shape, once known, enable the fringing field distribution to be accurately determined and suitable control of that distribution can be effected by appropriately positioning the clamp relative to the magnet boundary. The field distribution at entrance boundary 13 of the first main magnet, for example, is effectively demonstrated by the dashed lines 38 in FIG. 2.

A source of charged particles, which source may be of the type described in my above-referred to patents and publications, for example, and, therefore, is not described in detail here, is positioned at a location 12 as shown in FIG. 1 and is appropriately caused to emit a plurality of such particles toward the entrance boundary 13 of the first main magnet. As in previously known spectrographs, the charged particles which are to be examined travel through the spectrograph between the two pairs of pole faces in a vacuum so that the path of the charged particles is not appreciatively interrupted by any gas molecules. The structure required to maintain such an evacuated system is well understood to those in the art and, therefore, will not be described in detail here.

The trajectory of each charged particle is substantially a straight line outside the regions of the main and auxiliary magnetic fields created by the pairs of pole faces of each main magnet and of the auxiliary magnet. The trajectories are circular within such regions, the radius of curvature of the circular trajectory of any particular charged particle being directly proportional to the momentum of such particle. The trajectory of the central ray of such charged particles is depicted, for example, as solid line 14 in the figure.

A gap 15 exists between the exit boundary 16 of the first main magnet and the entrance boundary 17 of the second main magnet. Many suitable detecting devices well known to those in the art can be used at focal line 22 and for that reason, none are shown or described in detail here. It is clear, however, that such detecting devices may utilize photographic emulsion techniques, solid state counters, gas chambers, and the like, the choice being determined by the designer and/or user for the particular application desired.

Thus, particles being emitted from source 12 and having the same momentum are caused to focus at focal line 22 at substantially the same point. As shown in the figure, particles which enter the magnet system in the median plane at different angles from those which enter along the central ray line 14 follow different trajectories from the trajectory of such central ray line. Thus, particles entering at an angle on one side of central ray line 14, follow a trajectory line 23, for example, while particles entering on the opposite side of central ray line 14 follow a trajectory line 24, for example. At any rate, the entrance and exit boundaries of the magnets involved can be arranged so as to cause the trajectory lines for any particular group of charged particles having a specific momentum to focus at a focal point 25, for example, along focal line 22. Groups of particles having different momenta will tend to focus at different focal points 26 and 27, for example, along focal line 22. It is theoretically possible to design a spectrograph so that particles of any given momentum are caused to crossover, or focus, in the median plane at exactly the same point, even if the overall input angle $2\theta$ in the median plane (where the angle $\theta$ is as shown in the figure) is very large. However, for groups of particles having higher or lower momenta, the focus of particles of the same momentum will generally no longer be perfect, since aberrations will usually occur along the focal line and resolution of the overall instrument becomes poor.

Additionally, when particles which diverge or move off from the median plane are considered, the situation becomes even more complex and it becomes substantially impossible to design an instrument with exact point-to-point stigmatic focusing or even point-to-line focusing (i.e., an acceptance of some aberration effects in the transverse direction at focal line 22) unless the input solid angle of acceptance is exceptionally small. Appropriate shaping of the pole faces at the exit and entrance boundaries of the deflecting magnet or magnets in conventional magnetic spectrographs has been used to improve the capability of such devices for reducing aberrations and for increasing the resolving power.

Unfortunately, however, in such conventional magnetic spectrographs it has not been possible effectively to correct for aberrations which result from the divergence of particles out of the median plane and attempts to correct for such aberrations by appropriately shaping the entrance and exit boundaries of the pole face are substantially incompatible with the shaping of such boundaries for correction of aberrations in the median plane. This invention provides for substantially independent corrections of these apparently inconsistent aberrations.

Aberrations resulting from the divergence of rays out of the median plane in this invention are corrected primarily by appropriately shaping pole boundaries at the entrance to the first main magnet and at the exit of the second main magnet. Aberrations resulting from the divergence of rays within the median plane are corrected by appropriately shaping the pole boundaries at the exit of the first main magnet and at the entrance to the second main magnet. The capability for making such corrections substantially independently is brought about by providing for a crossover point, or an intermediate focal line, in the transverse direction within the gap 15 between the exit boundary of the first main magnet and the entrance boundary of the second main magnet. Thus, an intermediate image along a focal line 26 occurs approximately midway through the overall device. Because of such intermediate focusing, the displacement of rays of particles in the transverse direction out of the median plane at the intermediate image point is relatively small, while the displacement of rays of particles in the transverse direction out of the median plane at the entrance to the first main magnet and at the exit of the second main magnet is relatively large. Consequently, any corrections achieved by shaping of pole boundaries nearest the intermediate transverse crossover point cannot appreciably affect corrections of aberrations due to divergence out of the median plane achieved by shaping pole boundaries remote from such crossover point. Shaping of pole boundaries near the crossover point, therefore, can be used primarily to correct for aberrations within the median plane. Similarly, shaping of the pole boundaries at the entrance and exit of the first and second main magnets, respectively, (where the displacement from the median plane is at its greatest) can be achieved without irretrievably affecting the correction for aberrations within the median plane.

A first means which can be utilized to produce the intermediate image at focal line 26 is the fringing field which occurs at the entrance boundary of the first main magnet. In effect, such fringing field acts substantially as a magnetic lens system and by properly arranging the entrance angle of incoming particles relative to such fringing field the incoming particles can be focused along an intermediate focal line 26 within the gap 15. Thus, as shown in the simplified diagrammatic view of FIG. 3, particles entering the overall magnet system at relatively large angles in the transverse direction of the median plane are caused to deflect along trajectories indicated by solid lines 39, which lines intersect at the intermediate image position 26 in the median plane.

In addition to providing for an appropriate intermediate transverse crossover image by utilizing the fringing field effects at the entrance to the first main magnet, a quadrupole lens 28 may be placed at a position between particle source 12 and the entrance boundary to the first main magnet. The structure of such a quadrupole lens is well known and is discussed in my above-referred to Pat. No. 3,084,249. Such a lens can be arranged as shown to provide for the appropriate deflection of incoming particles to achieve a vertical or transverse crossover at the desired intermediate image position. While such a quadrupole lens may be used alone in order to produce the desired focusing, alternatively, it may also be used in combination with an appropriately designed fringing field effect at the entrance of the first main magnet, as discussed above, to produce the desired focusing of the intermediate image.

FIG. 3 also demonstrates the further transverse focusing which occurs substantially along output focal line 22 after the particles exit from the second main magnet. Such focusing is achieved through appropriate shaping of the exit boundary of the second main magnet and may be further enhanced by the use of an auxiliary sector magnet as shown. Alternatively, a second quadrupole lens may be substituted for the sector magnet.

As pointed out in my previously referred-to Pat. No. 3,213,276, for a point source of monoenergetic particles, aberrations in the overall device tend to produce an unsharp image at the output focal line. The width of this image can be determined by use of the following formula which gives the displacement $X$ for a given ray from the central ray 14 at its intersection 25 with the focal plane 22:

$$\Delta X = (X/\theta)\theta \\ + (X/\theta^2)\theta^2 + (X/\phi^2)\phi^2 \\ + (X/\theta^3)\theta^3 + (X/\theta\phi^2)\theta\phi^2 \\ + (X/\theta^4)\theta^4 + (X/\theta^2\phi^2)\theta^2\phi^2 + (X/\phi^4)\phi^4$$

(1)

The symobls $(X/\theta)$, $(X/\theta^2)$, $(X/\phi^2)$ . . . etc., represent so-called aberration coefficients and these are constants, characteristic of a given instrument. The angle $\theta$ is defined in FIG. 1 and the angle $\phi$ is defined in FIG. 3. The first order term $(X/\theta)$ is zero at the focal plane, indeed, the definition of the focal plane is the loci of the points at which $(X/\theta)$ is zero. The aim for the spectrograph designer is to make also the other higher order terms zero or negligibly small.

An expression similar to Eq. 1 can be written also for the quality of the focus in the transverse direction. However, aberrations in this direction do not affect the resolving power of the instrument.

In designing a spectrograph in accordance with the invention, a first order corrective design may be laid out initially by determining the appropriate deflection angles, entrance and exit angles of the main deflecting magnets, the free-flight distances, and the strength of the quadrupole lenses, is used. Such characteristics are appropriately chosen to provide the desired first order optical properties, such as the desired magnification of the overall system and the desired dispersion, i.e., separation of particles with different momenta along the focal line. In addition, the entrance angle and quadrupole lens can be arranged to be used in combination so as to produce the intermediate image in the appropriate position between the two main magnets.

Once a first order corrective layout is determined, the direction and curvture of the output focal line and the image aberrations on such focal lines can be determined by well-known ray tracing techniques which involve the use of numerical integrations, performed appropriately on a computer, to determine the trajectories of particles which are moving into and out of the magnetic field regions of the spectrograph. As previously mentioned, the first order coefficient $(X/\theta)$, can be made equal to zero for the full range of momenta by varying the curvature and position of the output focal line. However, the sensitivity of the various aberration coefficients to second, third, and fourth order curvatures of the various magnet pole boundaries represent a more complex situation. For example, to find the second order curvatures that make the most important second order aberration coefficients $(X/\theta^2)$ and $(X/\phi^2)$ zero and at the same time produce a desired orientation of the output focal line, an appropriate set of simultaneous equations must be solved. Such equations may take the form:

$$(X/\theta^2)_0 + \frac{a_1}{R_1} + \frac{a_2}{R_2} + \frac{a_4}{R_4} = 0 \qquad (2)$$

$$(X/\phi^2)_0 + \frac{b_1}{R_1} + \frac{b_2}{R_2} + \frac{b_4}{R_4} = 0 \qquad (3)$$

$$(\tan \psi)_0 + \frac{c_1}{R_1} + \frac{c_2}{R_2} + \frac{c_4}{R_4} = \tan \psi \qquad (4)$$

Here $(X/\theta^2)_0$ and $(X/\phi^2)_0$ are aberration coefficients calculated for a magnet with straight pole boundaries, $\psi$ is the angle between the central ray and the normal to the focal plane. The coefficients $a_1$, $b_1$, and $c_1$ are constants representing the changes in the coefficients when a unit second order curvature $(1/R_1)$ is introduced at boundary 1 (entrance to main magnet 1). Subscripts 2 and 4 refer similarly to boundaries 2 and 4 (exits of two main magnets). Boundary 3 might also have a second order curvature and, similarly, boundaries 5 and 6 of a third deflecting magnet might also be included. However, for simplicity Eqs. 2, 3 and 4 are only shown as suitable examples wherein boundaries 3, 5, and 6 are assumed to be substantially straight lines and consequently the second order curvature terms $(1/R_3, 1/R_5,$ and $1/R_6)$ are essentially zero.

Having then determined the second order curvatures of the appropriate pole boundaries, a new set of ray tracing calculations is then made so as to check both the orientation of the output focal line and to determine whether the second order aberrations have been reduced to minimum or zero values.

By solving still another set of simultaneous equations it is possible to determine the third order curvatures that make the most important third order aberration coefficients $(X/\theta^3)$ and $(X/\theta\phi^2)$ substantially zero while at the same time maintaining the desired curvature of the output focal line. The third order simultaneous equations are similar in form in Equations 2, 3 and 4 but have instead of the radii R (second order curvatures) appropriate parameters describing the third order curvatures (S-shapes) of the pole boundaries.

A new set of ray tracing calculations can then be made following the determination of third order corrections in order to check again the curvature of the output focal line and to determine whether the aberrations have been appropriately minimized.

Fourth order and fifth order corrections may also be made in a similar manner by solving similar sets of simultaneous equations. While theoretically such calculations can be carried to as high an order as desired, the extent to which such calculations are to be carried out to higher orders are determined by the designer who takes into account, for example, the overall accuracies required and the time and funds available to expend on such efforts. It soon becomes clear that the effects of higher order corrections become less significant and for most practical applications corrections through a fourth, or at most a fifth, order are all that are needed.

Once the appropriate pole boundary shapes have been determined and the aberrations reduced to their theoretical minimum values, fabrication of a device in accordance with such design considerations provides an instrument having the theoretically designed optimum characteristics. In some instances, when the machine ultimately has been maufactured and assembled for operation, the manufacturing and assembling process may introduce sufficient inaccuracies in the overall configuration to provide less than completely optimum aberration reduction in practical operation. It becomes desirable then to provide further dynamic corrective means for correcting aberrations which so arise, particularly in the median plane.

Such corrective element 41 is shown in simple diagrammatic form only in FIG. 1 as located substantially at the intermediate crossover point midway between the two main magnets. A more detailed structure of one possible embodiment of such corrective element 41 is depicted in FIGS. 4 and 5 as comprising a plurality of upper coils 42 mounted on a common upper core 43 and interspersed by upper iron teeth 44 and similarly a second plurality of lower coils 45, a lower core 46 and lower teeth 47 oppositely disposed to the upper teeth 44. FIG. 4 shows a longitudinal, cross-section view of said electromagnetic system while FIG. 5 shows an end view thereof. A gap 48 exists between each of said plurality of teeth in which gap a magnetic field is formed. If each of the upper coils has a current in the same direction with the same amplitude, and each of the lower coils has a current in the opposite direction with the same magnitude, a quadrupole-type field is created in the gap 48. A pair of nonmagnetic end members 53 are mounted at either end of the magnetic cores to provide rigidity of the device.

If the current in each coil is made proportional to the distance from the coil to the vertical center line of the device, a hexapole (sextupole) type field is created in the gap 48. In this case the field on the median plane of gap 48 is proportional to the square of the distance from the vertical centerline. Since the field direction then is everywhere the same, a return yoke is required and provided (49, 50, 51, 52). Higher order multipole fields are created in the same manner by appropriately grading the increase in coil current with the distance from the center line.

A substantially homogenous field (dipole) can also be created in the gap 48 if current carrying coils are provided around the return path, for instance the vertical members 49 and 52. Such coils are not shown in FIGS. 4 or 5.

The electronic circuitry regulating the currents to each pair of coils (one upper and one lower) in the corrective element can be so arranged that the fields of various multipole orders (dipole, quadrupole, etc.) can be superimposed upon each other. With standard electronic techniques it is simple to design the complete circuitry such that the strength of each multipole order can be varied with one single control.

An alternate method for creating the various order multipole fields is shown in FIG. 6. As depicted therein, each coil unit 55 (either upper or lower) is divided into two or more sections, one such section being utilized to contribute to each higher order multipole desired (except the dipole situation discussed above). The quadrupole sections 56, for example, have the same number of turns in each coil unit and all quadrupole sections are connected in series (or series-parallel) and powered by a single variable and reversible power supply 57. The hexapole sections 58, for example, each have a number of turns proportional to the distance from the coil unit to the vertical center line (the number of turns shown diagrammatically in the drawing being merely shown as exemplary for simplicity) and all these sections are connected in series and powered by a separate power supply 59. The series-connected upper coil unit sections may if desired be parallel-connected with the series-connected lower coil unit sections. Similarly, further octupole coil sections (not shown), if required, can be arranged to have a number of turns approximately proportional to the square of the distance from the coil unit to the vertical center line, and even higher order sections can also be appropriately arranged accordingly.

A quadrupole field created in this corrective element is equivalent to a change in the angle of orientation of a pole boundary. A hexapole field is equivalent to changing the second order curvature of a pole boundary, and so on. Thus, the corrective element provides a means for dynamic corrections of aberrations within the median plane.

Further, the dynamic corrective element may be used to correct for "kinematic broadening" effects, such effects being described in my previous article in "The Review of Scientific Instruments." As mentioned above earlier spectrographs have achieved correction for such kinematic broadening effects by physically displacing the detector until its position coincides with a position in the median plane where a new focal line can be found. However, if the broadening effect is relatively large, the distance which the detector must be moved may be too great to be physically accommodated in the particular spectrograph structure being utilized. Moreover, even if sufficient displacement of the detector is possible the focusing of particles in the transverse direction tends to deteriorate and the focal line itself becomes longer. However, the use of a corrective element of the type described above for producing an appropriately shaped magnetic field to correct dynamically for such kinematic broadening effects avoids the necessity for physically displacing the detector and the focal line can be maintained at a desired location even in the face of such effects. The magnetic field distribution needed for this correction is essentially superimposed on the corrections made for other aberrations so that the overall field distribution within the corrective elements is shaped to provide optimum correction of all such effects.

Since the corrective element is located at the transverse crossover point, its corrective action does not produce noticeable image deterioration in the transverse direction. The use of the multipolar arrangement for the corrective element provides for the complex shaping of the magnetic field which may be required to produce the desired overall corrections of higher order aberrations and kinematic broadening.

It is clear that other means may be used as a substitute for the auxiliary sector magnet near the output end of the spectrograph. Since the primary function of such auxiliary magnet is to provide for convergence of the particles in the transverse direction, a conventional quadrupole magnet of the type used, for example, at the input of the spectrograph may be used in place of the sector magnet. Thus, appropriate vertical focusing at the output focal line can be achieved without effecting the converging characteristics in the median plane.

What is claimed is:

1. An apparatus for measuring the energy spectrum of a plurality of charged particles emanating from a source of charged particles having differing energies, said apparatus comprising
    magnetic means adapted to receive said charged particles for deflecting and for stigmatically focusing said particles substantially along an output focal line which is external to said magnetic means and lies substantially in a plane corresponding to the median plane between the pole faces of said magnetic means, the positions of said focused particles along said output focal line being dependent on the momentum of said charged particles, said magnetic means including
        a first magnetic field region having a first entrance boundary and a first exit boundary;
        a second magnetic field region having a second entrance boundary and a second exit boundary;
    means for focusing said particles along an intermediate focal line lying substantially in said median plane between said first and said second magnetic field regions,
    said first entrance boundary and said second exit boundary each having a predetermined curved shape for correcting aberrations in the trajectories of particles moving off said median plane; and
    said first exit boundary and said second entrance boundary each having a predetermined curved shape for substantially independently correcting aberrations in the trajectories of particles moving in said median plane.

2. An apparatus as defined in claim 1 and further including a variable magnetic means positioned between said first and said second magnetic field regions for dynamically adjusting the correction of said aberrations in said median plane.

3. An apparatus as defined in claim 2 wherein said variable magnetic means includes
    a plurality of electromagnet means operating in combination to produce a magnetic field at or near said intermediate focal line; and
    means for controlling the current in said electromagnet means for adjusting the shape of said magnetic field.

4. An apparatus as defined in claim 3 wherein said variable magnetic means is arranged so that the current in each of said plurality of electromagnet means is independently controllable.

5. An apparatus as defined in claim 3 wherein said plurality of electromagnet means includes
    an upper electromagnet means comprising
        an upper magnetic core member;
        a plurality of upper coil units mounted adjacent one another on said upper magnetic core member;
        a plurality of upper magnet teeth each of said upper magnet teeth being mounted on said upper magnetic core member and positioned intermediate two adjacent upper coil units;
    a lower electromagnetic means being oppositely disposed with respect to said first electromagnet means and comprising
        a lower magnetic core member;
        a plurality of lower coil units mounted adjacent one another on said lower magnetic core member;
        a plurality of lower magnet teeth each of said lower magnet teeth being mounted on said lower magnetic core member and positioned intermediate two adjacent lower coil units; and
    wherein said current controlling means controls the current in each of said upper and lower coil units so as to produce a magnetic field region having a controllable magnetic field configuration between said upper and said lower electromagnet means.

6. An apparatus as defined in claim 5 wherein said current controlling means includes a plurality of power supply means for supplying a plurality of superimposed currents to said upper coil units and to said lower coil units, said superimposed currents thereby providing a plurality of multipole magnetic field configurations of differing orders between said upper and said lower electromagnet means.

7. An apparatus as defined in claim 5 wherein said upper coil units and said lower coil units each comprise a plurality of separate coil sections, corresponding coil sections of said upper and said lower coil units being interconnected to form sets thereof, and
said current controlling means includes a plurality of separate power supply means for supplying different currents to each of said sets of said corresponding coil sections,
whereby a plurality of multipole field configurations of differing orders are formed between said upper and said lower electromagnet means.

8. An apparatus as defined in claim 7 wherein one of said power supply means provides current for one of said sets of corresponding coil sections, the current in each of said coil sections being arranged to have an amplitude and direction so that at least one of said multipole magnetic field configurations between said upper and said lower electromagnet means is a quadrupole field.

9. An apparatus as defined in claim 8 wherein at least one other of said power supply means provides current for one other set of corresponding coil sections, the current in each of said coil sections being arranged to have an amplitude and direction so that at least one other of said multipole magnetic field configurations between said upper and said lower electromagnet means is a hexapole field.

10. An apparatus as defined in claim 1 wherein said focusing means includes a quadrupole magnet disposed between said source and said first entrance boundary.

11. An apparatus as defined in claim 10 and further including a quadrupole magnet positioned between said second magnetic field region and said output focal line.

12. An apparatus as defined in claim 11 and further including a variable magnetic means positioned between said first and said second magnetic field regions for dynamically adjusting the correction of said aberrations in said median plane.

13. An apparatus as defined in claim 10 and further including a sector magnet means positioned between said second magnetic field region and said output focal line.

14. An apparatus as defined in claim 13 and further including a variable magnetic means positioned between said first and said second magnetic field regions for dynamically adjusting the correction of said aberrations in said median plane.

15. An apparatus as defined in claim 1 and further including a third magnetic field region positioned between said second magnetic field region and said output focal line for providing further focusing of said particles at said output focal line.

16. An apparatus as defined in claim 15 wherein said third magnetic field region is established by a sector magnet.

17. An apparatus as defined in claim 15 wherein said third magnetic field region is established by a quadrupole magnet.

18. An apparatus as defined in claim 15 and further including magnetic clamping means positioned near the entrance and exit boundaries of said first, said second and said third magnetic field regions for adjusting the fringing magnetic fields at each of said boundaries.

References Cited

UNITED STATES PATENTS

| | | |
|---|---|---|
| 3,087,055 | 4/1963 | Liebl. |
| 3,213,276 | 10/1965 | Enge. |
| 3,405,363 | 10/1968 | Brown _____ 328—230 |

JAMES W. LAWRENCE, Primary Examiner

A. L. BIRCH, Assistant Examiner

U.S. Cl. X.R.

250—49.5; 328—230; 335—210